(No Model.)
I. ST. C. GOLDMAN.
HOSE BAND.
No. 499,985. Patented June 20, 1893.
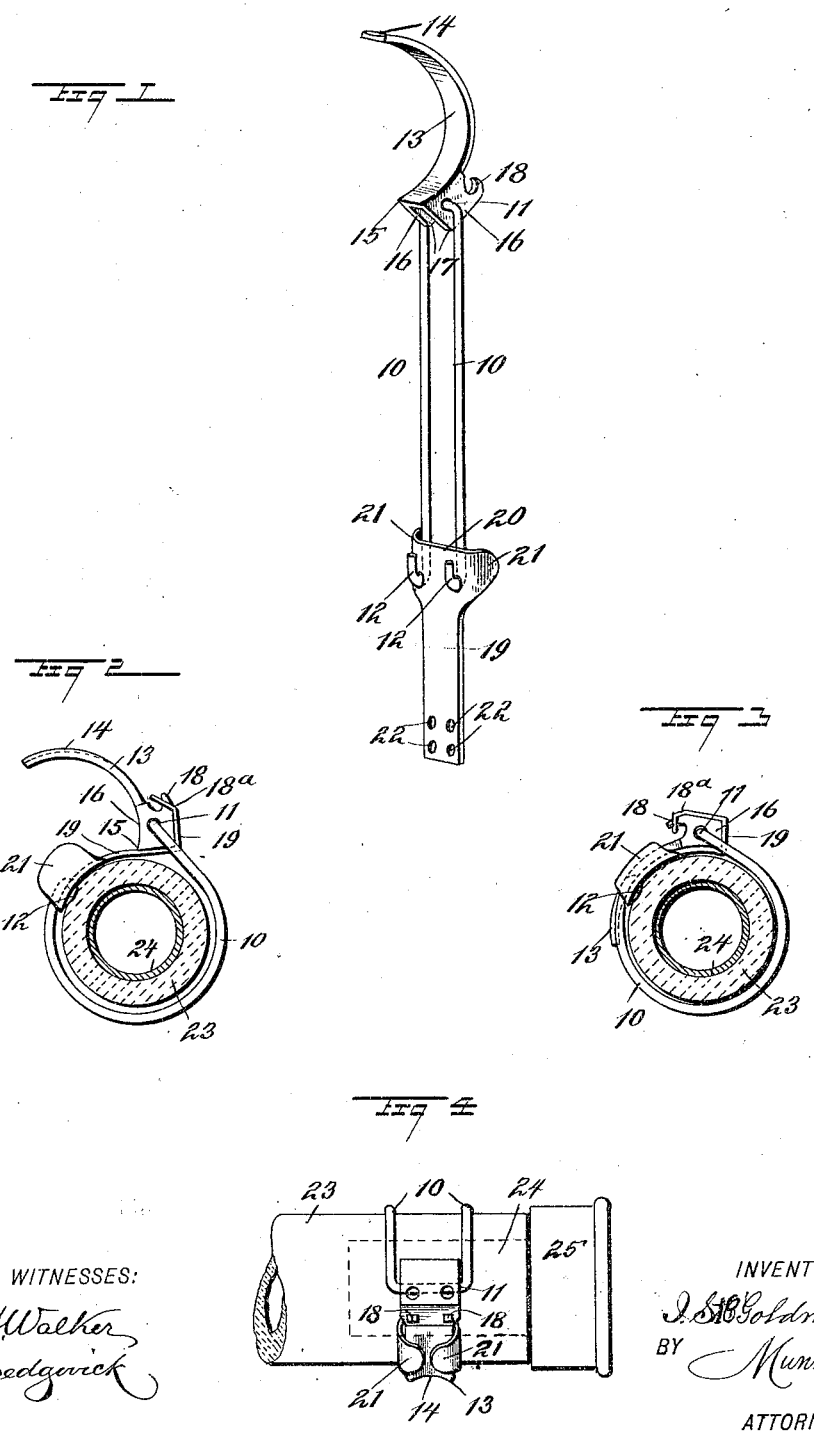
WITNESSES:
H. Walker
C. Sedgwick
INVENTOR
I. St. C. Goldman
BY Munn & Co.
ATTORNEYS.

UNITED STATES PATENT OFFICE.

ISAAC ST. C. GOLDMAN, OF LOS ANGELES, CALIFORNIA, ASSIGNOR TO IRVIN P. DOOLITTLE, OF SAME PLACE.

HOSE-BAND.

SPECIFICATION forming part of Letters Patent No. 499,985, dated June 20, 1893.

Application filed October 12, 1892. Serial No. 448,668. (No model.)

*To all whom it may concern:*

Be it known that I, ISAAC ST. C. GOLDMAN, of Los Angeles, in the county of Los Angeles and State of California, have invented a new and Improved Hose-Band, of which the following is a full, clear, and exact description.

My invention relates to improvements in that class of hose bands which are adapted to be fastened to a hose so as to bind the hose upon the spindle of a coupling or other attachment to which the hose is to be fastened.

The object of my invention is to produce an extremely cheap and simple hose band, which may be quickly and conveniently applied to a hose without the use of any special tools, which may be adjusted to fit hose of different sizes, which is constructed so that its operating lever exerts a progressive and increasing strain upon the band as it is tightened, and which is arranged in such a way that the mere operation of the lever and bending of the fastening strap serves to bind the band in place so that an auxiliary fastening is not necessary.

To these ends my invention consists in a hose band, the construction of which will be hereinafter described and claimed.

Reference is to be had to the accompanying drawings forming a part of this specification, in which similar figures of reference indicate corresponding parts in all the views.

Figure 1 is a perspective view of the band before its application to a hose. Fig. 2 is a side elevation of the band as applied to a hose, but before pressure is placed upon the fastening lever, the hose in this view being shown in cross section. Fig. 3 is a similar view but with the band fastened in place; and Fig. 4 is a side elevation of the hose with the band attached.

The body portion of the band is formed of wire having parallel members 10 adapted to be embedded somewhat in the surface of the hose, the members being united by the middle bend 11 and having parallel terminal hooks 12. The fastening lever 13 is fulcrumed on the bend 11 of the body, this lever having its under surface curved so as to fit snugly upon a hose, and its outer surface is concave slightly, as shown at 14, to provide for the firm fastening of the locking ears of the metal strap, as hereinafter described. The inner or fulcrumed end of the lever 13 terminates in a sharp angle 15 and to this end and on the exterior surface of the lever are outwardly extending parallel wings 16 having sharp corners 17 at the ends opposite the corner 15 of the lever and having their opposite edges provided with hooks 18 which are adapted to engage perforations in the metallic strap 19, as described below. This strap 19 is of flexible or malleable metal and it has a widened end 20 which is perforated so as to be placed upon the hooks 12, and this widened end terminates at its side edges in fastening ears 21 which are adapted to be bent over upon the lever 13 when the band is fastened to the hose.

The free end of the strap 19 is provided with a series of holes 22 which are adapted to engage the hooks 18 of the lever 13, and as one set of holes is nearer the free end of the strap than the other, the band may be adjusted to fit hose of different sizes.

Figs. 2 to 4 show the application of the band in which figures, 23 represents a hose and 24 the spindle of a coupling piece 25, the spindle extending into the hose in the usual way. The band is used for fastening the hose to the spindle and when applied, the flexible wire members 10 and the strap 19 are bent around the hose at a point opposite the spindle 24, and the hooks are made to engage a set of holes 22. The lever is then tipped backward and pressed downward upon the hose, and when the lever is tipped into the position shown in Fig. 2, it may be noticed whether or not the band will be sufficiently tight, after which the lever is pressed down, and if it appears that the band may be somewhat slack the lever is tipped forward and the hooks made to engage the second set of holes 22. The band being placed around the hose and the strap in engagement with the hooks, as in Fig. 2, the lever 13 is then tipped backward upon the hose its free end extending between the wire members 10. As soon as the lever begins to tip, the strap 19 is bent at an obtuse angle near its junction with the hooks, as shown at 18ª in Figs. 2 and 3, and the moment the lever starts the strap begins to tighten, thus tightening also the wire members 10 and the entire band. As the lever is tipped a little farther another sharp bend is made in the strap at the corners 17, and just before the final movement of the lever, when it is about to lie in contact with the hose, the sharpest bend of all is made in the strap at the edge or corner 15. It will be noticed that the fulcrum of the lever is, at all times, very close to the hose and the greatest pressure will come upon the band just before the lever is flattened upon the hose. At this point the strain is greatest upon the band and the leverage is greatly in favor of the operator, as the lever, its fulcrum, and the point of greatest resistance 15 are all substantially in a line. It follows then that the lever may be easily operated without the use of any special tool and a great strain produced upon the band so as to cause it to be firmly clasped to the hose.

It will be noticed that the movement of the lever causes the malleable strap 19 to be rolled over the wings 16, and each sharp bend produced in the strap, as described, serves as a fastening device so that when the lever is in its final position these successive bends will take up the strain and the lever would not work loose if it were not fastened in any way. To guard against any displacement, however, the ears 21 are used, and when the lever is brought to its final position these ears are bent over upon it and into the concavity 14, the ears being flattened down in place by striking upon them with a hammer or other convenient hard substance. There is no strain upon the ears, but they simply serve to hold the lever down so that it cannot be accidentally displaced.

Having thus described my invention, I claim as new and desire to secure by Letters Patent—

1. A hose band, comprising a flexible body having a curved lever at one end, the lever being provided near its fulcrum with outwardly extending wings having hooks at their inner ends, and a malleable strap produced on the opposite end of the body and having holes to engage the hooks on the lever wings, substantially as described.

2. A hose band, comprising a flexible body having parallel wire members, a curved lever fulcrumed at one end of the body and having outwardly extending parallel wings with hooks at their inner ends, a metallic strap secured to the opposite end of the body and provided with perforations to engage the hooks, and a fastening device to lock the lever, substantially as described.

3. A hose band, comprising a flexible body having parallel wire members, a curved lever fulcrumed at one end of the body and provided at its fulcrumed end with outwardly extending parallel wings having hooks at their inner ends, a malleable strap secured to the opposite end of the body and having holes therein to engage the lever hooks, and ears produced on opposite edges of the strap and adapted to be folded over upon the lever, substantially as described.

4. A hose band, comprising a flexible body having parallel wire members terminating at one end in hooks, a curved lever fulcrumed on one end of the body, the lever having a concave outer face, parallel wings on its outer side and at its fulcrumed end, and hooks produced upon the inner ends of the wings, and a malleable strap secured to the body hooks, the strap having perforations to engage the lever hooks and side wings adapted to be folded over into the concavity of the lever, substantially as described.

ISAAC ST. C. GOLDMAN.

Witnesses:
IRVIN P. DOOLITTLE,
G. G. JOHNSON.